June 11, 1957   P. PUTNAM   2,795,273
SPEED REGISTERING DEVICE
Filed Feb. 26, 1954

Peter Putnam
*INVENTOR.*

BY
Attorney

United States Patent Office 2,795,273
Patented June 11, 1957

2,795,273
SPEED REGISTERING DEVICE

Peter Putnam, Nashua, N. H., assignor to Sanders Associates, Incorporated, Nashua, N. H., a corporation of Massachusetts Application February 26, 1954, Serial No. 412,680

6 Claims. (Cl. 161—18)

This invention relates to the art of vehicle speed measuring. More particularly, this invention relates to speed registering devices such as are employed to measure the speeds of motor vehicles on highways.

In the past, speed registering devices have been caused to function by measuring the elapsed time for a vehicle to travel between measured spaced points on a highway. Switch actuators, associated with the measured points are caused to operate by the wheels of the vehicle. In order to obtain accurate speed indications, prior art requires a relatively large distance between the actuators.

It is an object of this invention to provide an improved speed registering device that permits a fast and accurate speed measurement; and It is a further object of the invention to provide an improved speed registering device that is economical and reliable.

Other objects of the invention will be apparent from the following detailed description of a typical embodiment thereof, taken in connection with the accompanying drawings.

In accordance with this invention there is provided an electronic device for providing a visual indication of vehicle speed comprising an elongated mat adapted to be disposed in the path of a moving vehicle. Control members, preferably pneumatic, are disposed in the mat at a predetermined distance spaced in the direction of motion of the vehicle. The mat is adapted to producing electronic control impulses upon the passage of a vehicle across it. A voltmeter is connected to a source of voltage to provide a visual indication of speed. Also provided are means for applying the pulses from one of the control members to initiate action by the voltage source and means to apply the pulses of the other control member to the voltmeter to cause an indication thereby of the speed of the vehicle.

Figure 1:
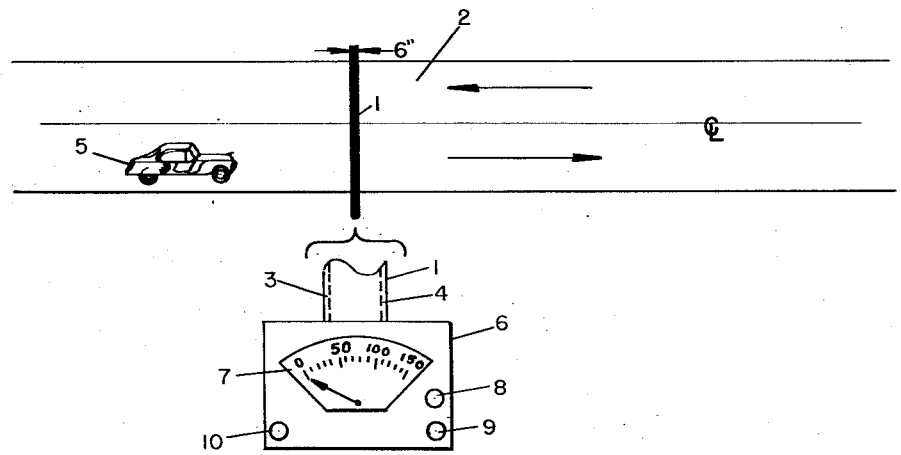
Figure 2:
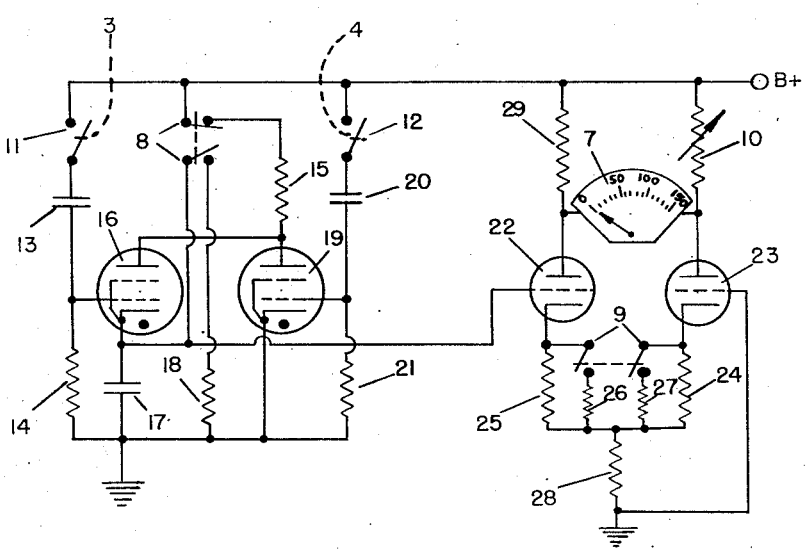

In the accompanying drawings, Fig. 1 is a schematic diagram, illustrating the speed registering device as positioned with reference to a vehicle on a highway. Fig. 2 is a schematic circuit diagram of the speed registering device.

Referring now in more detail to the drawings in Fig. 1, mat 1 is disposed on highway 2. Pneumatic tubes 3 and 4 are separated six inches apart, for example, and contained within mat 1. A vehicle 5 is shown about to cross the mat. The mat 1 is connected to a control box 6 which contains the speed indicating meter 7. A momentary contact reset switch 8 of control box 6 permits the device to respond to selected vehicles. Switch 9 permits a higher meter sensitivity and an adjustable control 10 is provided to calibrate the meter.

The mat 1 may be of different lengths to meet varying highway conditions and in the preferred embodiment is made of rubber. The pneumatic tubes 3 and 4 are similar in design to conventional pneumatic hoses as currently employed in traffic control for actuating electrical switches.

In other embodiments, of course, the switches may be incorporated in the mat 1.

The velocity of the vehicle is determined by measuring the elapsed time between the actuation of tubes 3 and 4. The meter is calibrated to read directly in miles per hour from 0 to 150 miles per hour. The maximum speed of 150 miles per hour corresponds to an elapsed time of .00227 second.

After the vehicle has crossed the mat 1, the reading on meter 7 is maintained until reset switch 8 is pressed to ready the device for a new reading. The mat is reversible to permit vehicles traveling in either direction properly to actuate the device.

Referring now in more detail to the schematic circuit diagram of Fig. 2, the gas discharge tetrodes 16 and 19 and their associated components comprise a control circuit for developing a voltage which is proportional to the elapsed time. Triodes 22 and 23, meter 7 and their associated components comprise a vacuum tube voltmeter calibrated in miles per hour. The triodes 22 and 23 must have a low grid characteristic such as a 2C51. The switches 11 and 12 are actuated by pneumatic tubes 3 and 4.

A source of relatively high voltage labeled B+ is applied by switch 11 to cause capacitor 13 to charge positively with respect to ground through resistor 14. The voltage across resistor 14 is applied to the control grid of tube 16. The cathode and grid #2 of tube 16 are connected together to capacitor 17 to ground. In parallel with capacitor 17 are connected resistor 18 and one section of the momentary contact reset switch 8. The voltage across capacitor 17 is connected to the control grid of the voltmeter triode 22. The plate of tube 16 is connected through resistor 15 and the other section of reset switch 8 to B+. The plate is also connected directly to the plate of tube 19. The cathode and grid #2 of tube 19 are grounded. Switch 12 applies B+ to cause capacitor 20 to charge through resistor 21 and apply a positive voltage to the control grid of that tube.

The cathode of the triode 22 is connected through resistors 25 and 28 to ground. Its plate is connected through resistor 29 to B+. The meter 7 is connected between the plate of triode 22 and the plate of triode 23. In parallel with resistor 25 are connected one section of sensitivity control switch 9 and resistor 26. The cathode of triode 23 is connected through resistor 24 to the junction between resistors 25 and 28. In parallel with resistor 24 are another section of sensitivity control switch 9 and resistor 27. The control grid of that tube is grounded. The plate of triode 23 is connected through calibration control resistor 10 to B+.

When a vehicle passes over hose 3 the switch 11 is closed to cause capacitor 13 to charge through resistor 14 and fire tube 16 which is normally cut off. Capacitor 17 charges through tube 16, resistor 15, the normally closed section of switch 8 and B+. Capacitor 17 continues to charge until the actuation of hose 4 causes switch 12 to close to charge capacitor 20 through resistor 21 and fire tube 19. A negative pulse at the plate of tube 19 quenches tube 16, and capacitor 17 ceases to charge. The voltage across capacitor 17 is applied to the electronic voltmeter to produce a reading in miles per hour in meter 7. The reading on meter 7 remains until reset switch 8 is pressed. The normally open section of switch 8, in series with resistor 18, closes to discharge capacitor 17. The normally closed section of switch 8, in series with resistor 15, opens to quench tube 19 and restore the system to its original condition when the switch 8 is released.

Sensitivity control switch 9 may be a double-pole, single-throw toggle switch which is normally open. The switch 9 may be closed to increase the sensitivity of the electronic voltmeter. Adjustable resistor 10 may be adjusted to obtain a 0 reading on meter 7.

The use of this invention greatly enhances the flexibility of speed registering devices. A unit embodying this invention may be carried by a patrol car or motorcycle, and readily positioned to observe vehicle speeds. The device may be readily retrieved to facilitate the pursuit of speed limit violators. In addition, many other applications in the field of traffic control are made possible.

While there has been hereinbefore described what is at present considered a preferred embodiment of the invention, it will be apparent that many and various changes and modifications may be made with respect to the embodiment illustrated without departing from the spirit of the invention. It will be understood, therefore, that all those changes and modifications as fall fairly within the scope of the present invention, as defined in the appended claims, are to be considered as a part of the present invention.

What is claimed is:

1. An electronic control device for providing an indication of the speed of a vehicle having wheels of a predetermined circumferential dimension comprising control elements disposed in the path of said vehicle and spaced in its direction of motion by a dimension less than that of the circumference of a wheel of said vehicle apart, said control elements being an integrally formed one piece unit adapted to effect control impulses upon the passage of said vehicle; means responsive to the first of said control impulses; means responsive to the second of said control impulses, whereby said first means initiates the development of a control voltage and said second means terminates the development of said control voltage; and timer means responsive to said control voltage and capable of time measurements below 10 milliseconds to provide substantially a measurement of instantaneous speed of said vehicle in a time interval less than that required for said vehicle to travel the length of said circumferential dimension.

2. An electronic control device for providing an indication of the speed of a vehicle having wheels of a predetermined circumferential dimension comprising pneumatic control elements disposed in the path of said vehicle and spaced in its direction of motion by a dimension less than that of the circumference of a wheel of said vehicle apart, said control elements being an integrally formed one piece unit adapted to effect control impulses upon the passage of said vehicle; means responsive to the first of said control impulses; means responsive to the second of said control impulses, whereby said first means initiates the development of a control voltage and said second means terminates the development of said control voltage; and timer means responsive to said control voltage and capable of time measurements below 10 milliseconds to provide substantially a measurement of instantaneous speed of said vehicle in a time interval less than that required for said vehicle to travel the length of said circumferential dimension.

3. A device for providing an indication of vehicle speed comprising an elongated mat adapted to be disposed in the path of a moving vehicle having wheels of a predetermined circumferential dimension; control members disposed in said mat, spaced by a dimension less than that of the circumference of a wheel of said vehicle apart in the direction of motion of said vehicle and adapted to effect control impulses upon the passage of a wheel of said vehicle across the mat; a timing meter capable of time measurements below 10 milliseconds to provide substantially a measurement of instantaneous speed of said vehicle in a time interval less than that required for said vehicle to travel the length of said circumferential dimension; means connecting said meter to one of said control members to initiate action by said means upon movement of said wheel thereover; and means connecting another of said control members to said meter to cause an indication thereby of the speed of said vehicle.

4. An electronic device for providing an indication of vehicle speed comprising an elongated mat adapted to be disposed in the path of a moving vehicle having wheels of a predetermined circumferential dimension; pneumatic control members disposed in said mat and spaced apart in the direction of motion of said vehicle by a dimension less than that of the circumference of a wheel of said vehicle and adapted to produce electronic control impulses upon the passage of a wheel of a vehicle across the mat; a source of voltage; a voltmeter connected to said source providing an indication of speed in a time interval less than that required for said vehicle to travel the length of said circumferential dimension; means applying the pulses from one of said control members to initiate action by said voltmeter means upon movement of a vehicle thereover; and means applying the pulses of another of said control members to said voltmeter to cause an indication thereby of the speed of said vehicle.

5. An electronic device for providing an indication of vehicle speed comprising an elongated mat adapted to be disposed in the path of a moving vehicle having wheels of a predetermined circumferential dimension; a pair of pneumatic control elements disposed in said mat and spaced apart in the direction of motion of said vehicle a dimension less than that of the circumference of a wheel of said vehicle; a source of voltage; a first tetrode gas discharge tube having a control grid, a second grid, a cathode connected to said second grid and an anode; a second tetrode gas discharge tube having a control grid, a second grid, a cathode connected to said second grid and an anode connected to the anode of said first tube; an anode resistor connected in series with said anodes; a first switch connecting said anode resistor to the positive terminal of said voltage source; a charge capacitor connected to the cathode of said first tube and to the negative terminal of said voltage source; a resistor connected between the control grid of said first tube and the negative terminal of said voltage source; a second capacitor connected to the control grid of said first tube; a second switch connecting said second capacitor to the positive terminal of said voltage source, said second switch being actuated by one of said pneumatic control elements; a resistor connected between the control grid and cathode of said second gas tetrode, said cathode of said second tube being connected to said negative terminal; a third capacitor connected to said control grid of said negative terminal; a third capacitor connected to said control grid of said second gas tetrode; a third switch connecting said third capacitor to said positive terminal, said switch being actuated by the other of said pneumatic control elements; a discharge resistor; a fourth switch connecting said discharge resistor in parallel with said charge capacitor; and an electronic voltmeter connected to the positive side of said charge capacitor providing an indication of speed upon the passage of a vehicle across said mat, said speed indication being restored to zero upon the actuation of said first and fourth switches.

6. An electronic control device for providing an indication of the speed of a vehicle having wheels of a predetermined circumferential dimension, comprising: control elements disposed in the path of said vehicle and spaced apart in its direction of motion by a dimension less than that of the circumference of a wheel of said vehicle, said control elements being adapted to effect control impulses upon the passage of said vehicle; means responsive to the first of said control impulses; means responsive to the second of said control impulses, whereby said first means initiates the development of a control voltage and said second means terminates the development of said control voltage; and timer means responsive to said control voltage and capable of time measurements below 10 milliseconds to provide substantially a measurement of instantaneous speed of said vehicle in a time interval less than that required for said vehicle to travel the length of said circumferential dimension.

References Cited in the file of this patent

UNITED STATES PATENTS

| | | |
|---|---|---|
| 1,526,337 | Hartley | Feb. 17, 1925 |
| 1,925,483 | Dubois | Sept. 5, 1933 |
| 1,946,290 | Lord | Feb. 6, 1934 |
| 2,576,415 | Prather et al. | Nov. 27, 1951 |
| 2,587,775 | Sheldon et al. | Mar. 4, 1952 |
| 2,622,678 | Peterson | Dec. 23, 1952 |
| 2,635,692 | Scheske | Apr. 21, 1953 |